(12) United States Patent
Chen

(10) Patent No.: US 12,001,748 B1
(45) Date of Patent: Jun. 4, 2024

(54) DISPLAY APPARATUS AND DISPLAY PANEL WITH IMPROVED ALIGNMENT IN SPLICED PANEL

(71) Applicant: Hubei Yangtze Industrial Innovation Center of Advanced Display Co., LTD., Wuhan (CN)

(72) Inventor: Donghua Chen, Xiamen (CN)

(73) Assignee: Hubei Yangtze Industrial Innovation Center of Advanced Display Co., LTD., Wuhan (CN)

( * ) Notice: Subject to any disclaimer, the term of this patent is extended or adjusted under 35 U.S.C. 154(b) by 0 days.

(21) Appl. No.: 18/112,509

(22) Filed: Feb. 22, 2023

(30) Foreign Application Priority Data

Dec. 12, 2022 (CN) .......................... 202211590646.0

(51) Int. Cl.
G06F 3/14 (2006.01)
G06F 3/147 (2006.01)
G09G 3/32 (2016.01)

(52) U.S. Cl.
CPC ............ G06F 3/1446 (2013.01); G06F 3/147 (2013.01); G09G 3/32 (2013.01); G09G 2300/026 (2013.01); G09G 2320/0686 (2013.01); G09G 2360/04 (2013.01)

(58) Field of Classification Search
CPC .................................................... G06F 3/1446
See application file for complete search history.

(56) References Cited

U.S. PATENT DOCUMENTS

| | | | | |
|---|---|---|---|---|
| 6,014,193 A | * | 1/2000 | Taira | G09G 3/3666 349/110 |
| 2008/0088568 A1 | * | 4/2008 | Haga | G09G 3/3648 345/100 |
| 2011/0057861 A1 | * | 3/2011 | Cok | H10K 59/18 345/1.3 |
| 2016/0132281 A1 | * | 5/2016 | Yamazaki | G06F 3/0448 345/1.3 |
| 2019/0179591 A1 | * | 6/2019 | Kuo | G06F 3/1446 |
| 2019/0347985 A1 | * | 11/2019 | Shaeffer | H05B 45/20 |
| 2020/0168585 A1 | * | 5/2020 | Lo | H01L 25/0753 |
| 2022/0374189 A1 | * | 11/2022 | Kuo | G09G 3/32 |

FOREIGN PATENT DOCUMENTS

CN 109920336 A 6/2019
CN 110289280 A 9/2019

* cited by examiner

*Primary Examiner* — William Boddie
*Assistant Examiner* — Andrew B Schnirel
(74) *Attorney, Agent, or Firm* — Anova Law Group, PLLC

(57) ABSTRACT

A display apparatus and a display panel are provided in the present disclosure. The display apparatus includes a plurality of display panels. A display panel of the plurality of display panels includes a display region and a binding region; the display region includes a first side and a second side which are opposite to each other; the binding region is on the first side; the plurality of display panels includes a first display panel and a second display panel; and a second side of the first display panel is spliced with a second side of the second display panel, where the plurality of display panels includes redundant electrodes.

20 Claims, 20 Drawing Sheets

Second direction

DISPLAY APPARATUS AND DISPLAY PANEL WITH IMPROVED ALIGNMENT IN SPLICED PANEL

CROSS-REFERENCE TO RELATED APPLICATION

The present disclosure claims the priority of Chinese Patent Application No. 202211590646.0, filed on Dec. 12, 2022, the content of which is incorporated herein by reference in its entirety.

TECHNICAL FIELD

The present disclosure generally relates to the field of display technology and, more particularly, relates to a display apparatus and a display panel.

BACKGROUND

With the development of display technology, the application of large-sized display panels becomes wider, such that research and fabrication of large-sized display panels gradually become a research hotspot for those skilled in the art.

SUMMARY

One aspect of the present disclosure provides a display apparatus. The display apparatus includes a plurality of display panels. A display panel of the plurality of display panels includes a display region and a binding region; the display region includes a first side and a second side which are opposite to each other; the binding region is on the first side; the plurality of display panels includes a first display panel and a second display panel; and a second side of the first display panel is spliced with a second side of the second display panel, where the plurality of display panels includes redundant electrodes.

Another aspect of the present disclosure provides a display panel. The display panel includes a display region and a binding region, where the display region includes a first side and a second side which are opposite to each other, and the binding region is on the first side; and further includes redundant electrodes.

Other aspects of the present disclosure may be understood by those skilled in the art in light of the description, the claims, and the drawings of the present disclosure.

BRIEF DESCRIPTION OF THE DRAWINGS

To clearly illustrate technical solutions in embodiments of the present disclosure, the drawings that need to be used in embodiments of the present disclosure are described briefly hereinafter. Obviously, the drawings in following description are only embodiments of the present disclosure, and those skilled in the art may also obtain other drawings according to the drawings without creative efforts.

The structures, proportions, sizes and the like shown in the drawings of the present disclosure may be only configured to match the content disclosed in the present disclosure for those skilled in the art to understand and may not be configured to limit the present disclosure, which may not have technical significance. Any structure modifications, proportional relationship changes or size adjustments shall still fall within the scope covered by the technical content disclosed in the present disclosure without affecting the effect and objective of the present disclosure.

DETAILED DESCRIPTION

Embodiments of the present disclosure are clearly and completely described in conjunction with the drawings in embodiments of the present disclosure hereinafter. Obviously, described embodiments are only some embodiments of the present disclosure, not all embodiments. Based on embodiments in the present disclosure, all other embodiments obtained by those skilled in the art without making creative efforts belong to the scope of protection of the present disclosure.

In order to make above-mentioned objectives, features and advantages of the present disclosure more obvious and comprehensible, the present disclosure is further described in detail below in conjunction with drawings and implementation manners.

Currently, one method for fabricating large-sized display panel is to splice small-sized display panels to obtain the large-sized display panel, but such method may result in the misalignment problem of monochromatic dots in fabricated large-sized display panel. Therefore, there is a need to provide a display panel capable of avoiding misalignment of the monochromatic dots.

At present, there are two manners for fabricating large-sized display panels as the following. 1) Large-sized display panels are directly fabricated, but the display panels fabricated by such manner have problems such as low yield rate and insufficient drive ability; and 2) small-sized display panels are fabricated first, and then the small-sized display panels are spliced to obtain large-sized display panels. Manner 2 may solve the problems of low yield rate and insufficient drive ability in manner 1, but there is the misalignment problem of the monochromatic dots when the large-sized display panels formed by splicing small-sized display panels are used for display.

Figure 1:
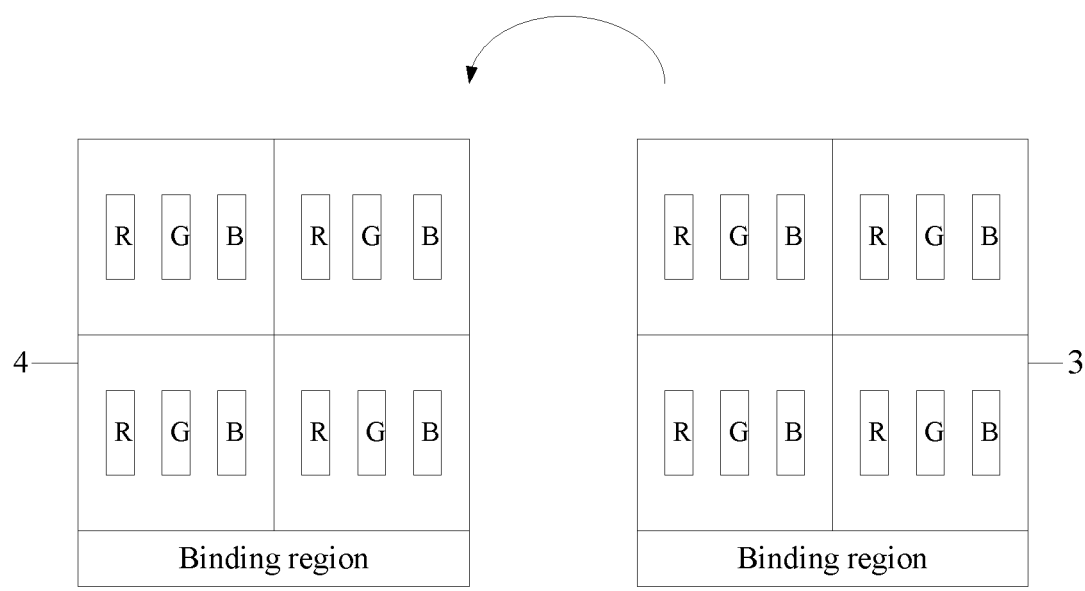
FIG. 1 illustrates a structural schematic of display panels in a display apparatus.
Figure 2:
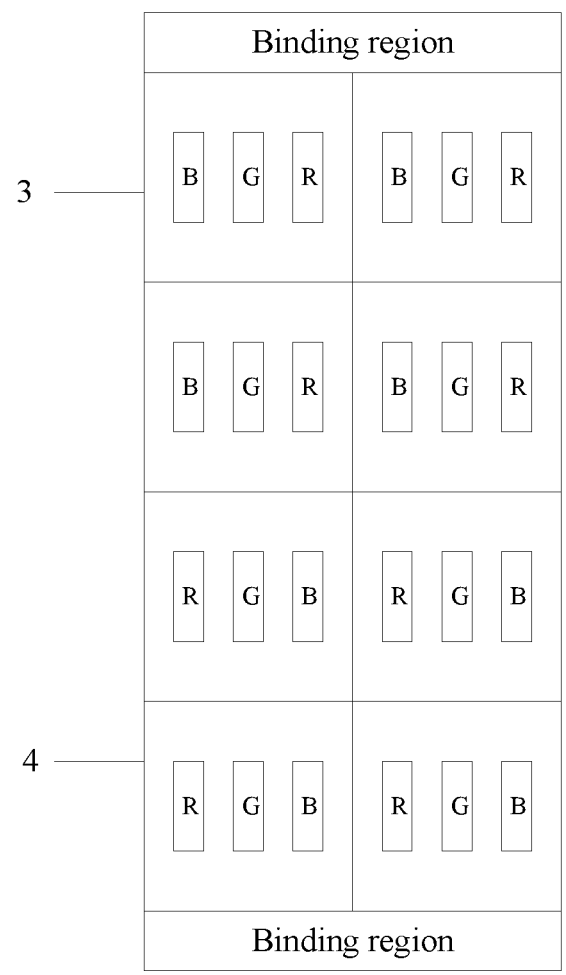
FIG. 2 illustrates a structural schematic of a display apparatus.

For example, the display panel may include a display region and a binding region. The binding region may be configured to dispose a drive circuit, which may be an invalid display region not for displaying. Therefore, when the large-sized display panel is spliced by a plurality of small-sized display panels, a part of the panels in the display region may need to be rotated by 180° during the splicing process before splicing such panels with each other. As shown in FIG. 1, a display panel 3 may be rotated 180° to be spliced with a display panel 4. Therefore, the display regions of two display panels may be spliced, and the binding regions may be separated from each other, so that the display apparatus shown in FIG. 2 may be obtained. However, as shown in FIG. 2, after the display panel 3 is rotated by 180° to be spliced with the display panel 4, the pixel arrangement of the display panel 3 and the display panel 4 may be different. For example, the colors of the pixels displayed in a same column in the spliced display panels may not be exactly same. As the first column, third column, fourth column, and sixth column shown in FIG. 2, the display panel formed after splicing may have the misalignment problem, resulting in misalignment of the monochromatic dots.

Figure 3:
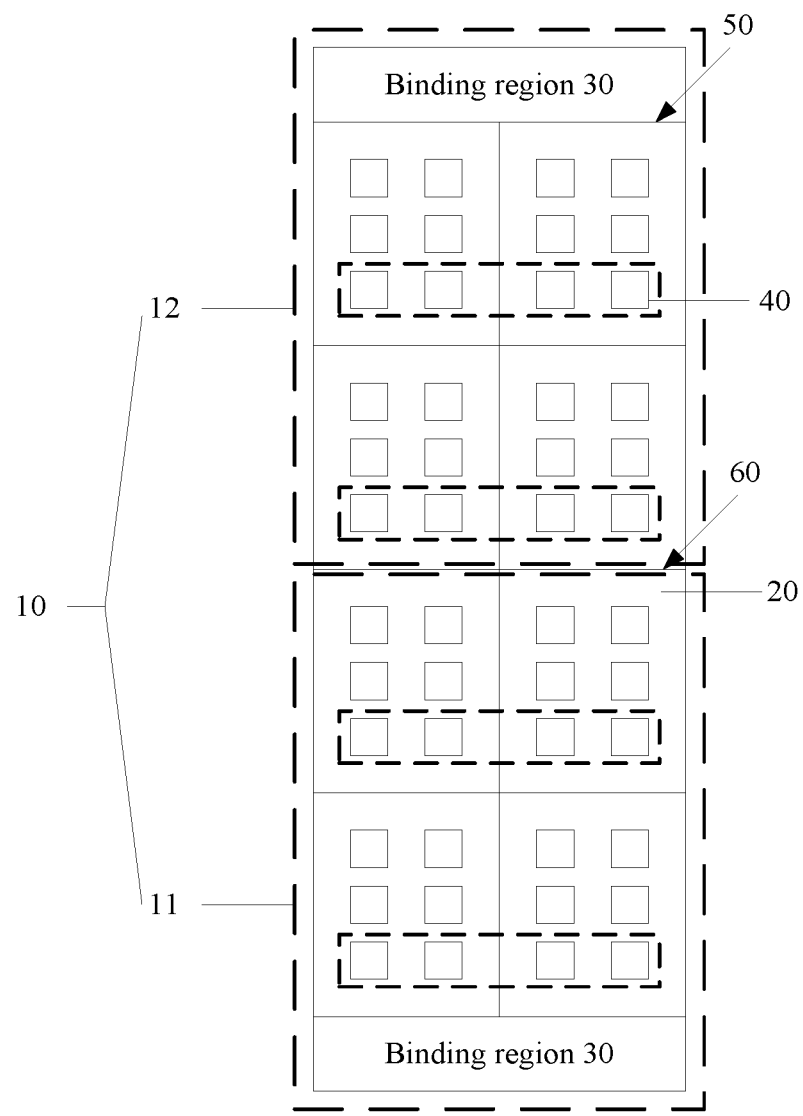
FIG. 3 illustrates a structural schematic of a display apparatus according to various embodiments of the present disclosure.

Referring to FIG. 3, the present disclosure provides a display apparatus. The display apparatus may include display panels 10, where the display panel 10 may include a display region 20 and a binding region 30; the display region may include the first side 50 and second side 60 which are opposite with each other; and the binding region 30 may be on the first side 50. The display panels may include the first display panel 11 and the second display panel 12. The second side 60 of the first display panel 11 may be spliced with the second side 60 of the second display panel 12. The display panel 10 may include redundant electrodes 40, that is, both the first display panel 11 and the second display panel 12 may include redundant electrodes 40.

It should be noted that the display apparatus provided in the present disclosure may include a plurality of display panels, for example, include the third display panel, the fourth display panel, the fifth display panel, and the sixth display panel. The second side of the third display panel may be spliced with the second side of the fourth display panel, and the second side of the fifth display panel may be spliced with the second side of the sixth display panel. The first display panel and the second display panel may form the first splicing panel; the third display panel and the fourth display panel may form the second splicing panel; and the fifth display panel and the sixth display panel may form the third splicing panel. The first splicing panel, the second splicing panel and the third splicing panel may be spliced sequentially. For example, the display regions of above-mentioned three splicing panels may be connected to each other, and the binding regions on two sides may be respectively connected to each other. When the display apparatus includes more display panels, the splicing of the display panels refers to above-mentioned splicing process, which may not be described in detail herein.

For example, in embodiments of the present disclosure, the display apparatus may include two display panels which are spliced with each other; the binding regions of the display panel may be on two sides of the splicing gap, and the display regions may be spliced to form the display apparatus with a relatively large display region.

Moreover, the display panels in the display apparatus may include redundant electrodes, that is, both the first display panel and the second display panel may include redundant electrodes. That is, in the first display panel and the second display panel, in addition to electrodes electrically connected to the light-emitting elements, electrodes not electrically connected to the light-emitting elements may also be included. Different electrodes may be electrically connected to the light-emitting elements of different colors. In such way, both the first display panel and the second display panel may include a plurality of electrodes capable of being electrically connected to the light-emitting elements of different colors. Therefore, when fabricating the display apparatus, according to display requirements of the display apparatus, on the first display panel and the second display panel, the light-emitting elements of corresponding colors may be selectively soldered to avoid the misalignment problem of the monochromatic dots in the display panel formed by the splicing process.

In addition, the display panels may include redundant electrodes, that is, the first display panel and the second display panel may include redundant electrodes. Therefore, when fabricating the display apparatus, according to display requirements of the display apparatus, the electrodes in the first display panel and the second display panel may be selectively soldered with the light-emitting elements of corresponding colors; and two display panels may be spliced together. That is, the light-emitting elements of corresponding colors may be soldered on a same display panel with a same substrate, and two display panels with different substrates may not need to be fabricated. Therefore, the substrates of the first display panel and the second display panel in the display apparatus provided in embodiments of the present disclosure may be same, that is, the display apparatus may use the display panels with same substrates, thereby simplifying the fabricating process of the display apparatus.

Figure 4:
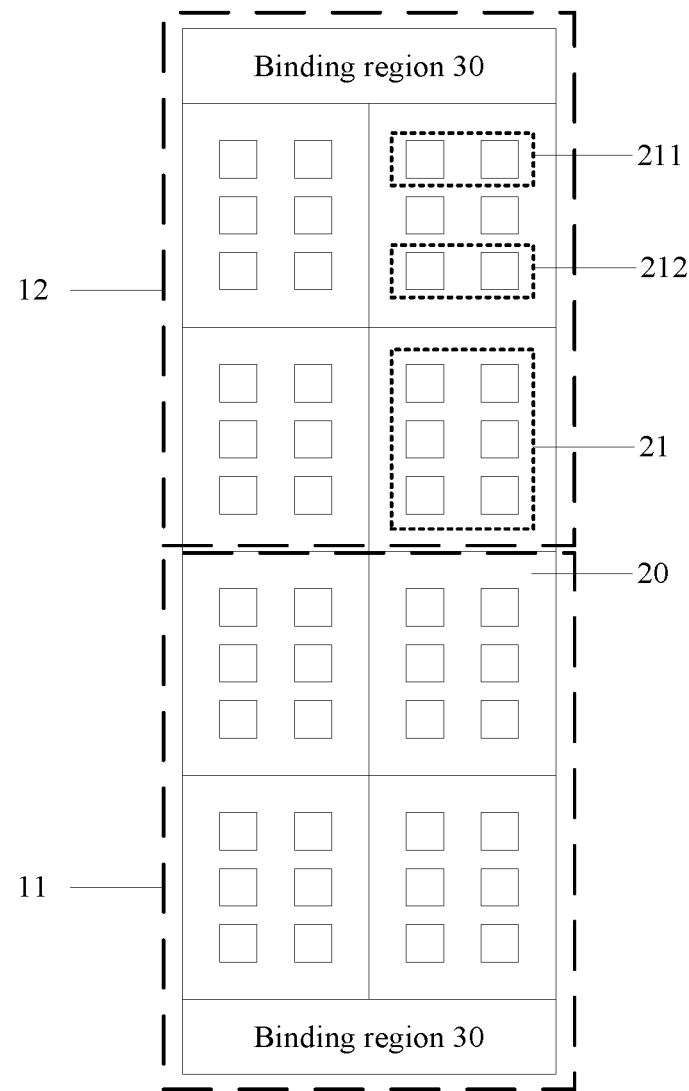
FIG. 4 illustrates a structural schematic of electrode units in a display apparatus according to various embodiments of the present disclosure.

On the basis of above-mentioned embodiments, in one embodiment of the present disclosure, referring to FIG. 4, the display region 20 of the display panel may include a plurality of electrode units 21 arranged in an array; and the electrode unit 21 may include two first electrodes 211 and two second electrodes 212. Two first electrodes 211 may be respectively configured to drive two light-emitting elements of different colors, and two second electrodes 212 may be respectively configured to drive two light-emitting elements of different colors; and two first electrodes 211 and two second electrodes 212 may not be electrically connected to light-emitting elements simultaneously. Therefore, when preparing the display apparatus, corresponding light-emitting elements may be selectively soldered on the electrodes of the display panels according to actual needs, which may avoid the misalignment problem of monochromatic dots in spliced display panels. For example, two first electrodes may be respectively configured to drive red and blue light-emitting elements, and two second electrodes may be respectively configured to drive red and blue light-emitting elements. However, the present disclosure may not limit the colors of the light-emitting elements electrically connected to the electrodes, which may depend on actual needs. It should be noted that electrodes among two first electrodes and two second electrodes that are not connected to the light-emitting elements may be redundant electrodes.

On the basis of above-mentioned embodiments, in one embodiment of the present disclosure, as shown in FIG. 4, the binding regions 30 of the display apparatus may be symmetrical with respect to the splicing gap. That is, the binding regions 30 of the display apparatus may be respectively on two sides of the splicing gap, and the distances from the binding regions 30 to the splicing gap may be same; and when the substrates of two display panels are same, the sizes of two display panels may also be exactly same. Therefore, the substrates of two display panels in the display apparatus may be same, and the display apparatus may use two display panels with same substrates, which may simplify the fabricating process of the display panels provided in the present disclosure.

Figure 5:
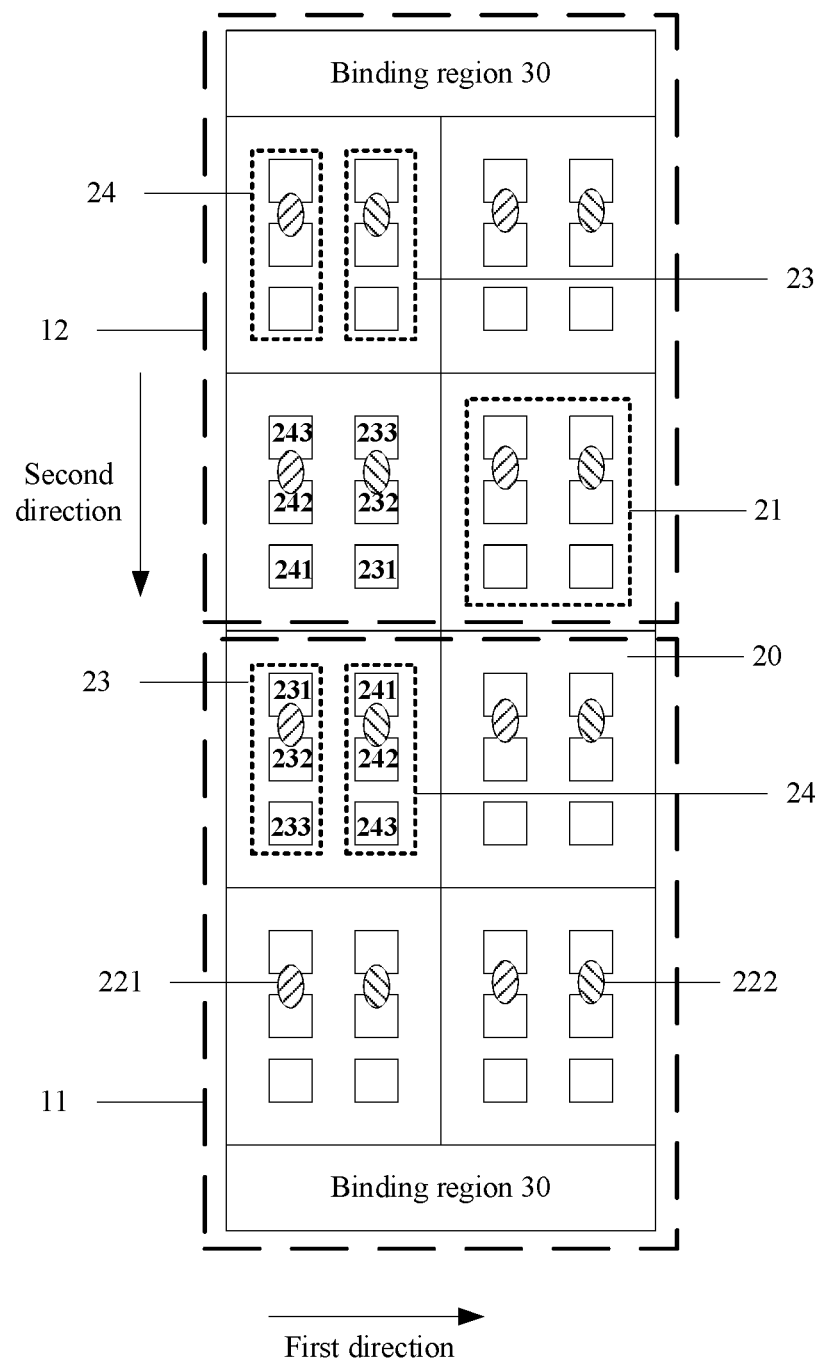
FIG. 5 illustrates a structural schematic of display panels in a display apparatus according to various embodiments of the present disclosure.

On the basis of above-mentioned embodiments, in one embodiment of the present disclosure, as shown in FIG. 5, the display panel may further include light-emitting elements 22 and the plurality of electrode units 21 arranged in an array in the display region 20. The light-emitting elements 22 may include first-color light-emitting elements 221 and second-color light-emitting elements 222; the electrode unit 21 may include the first electrode group 23 and the second electrode group 24; the first electrode group 23 may include the first anode 231, the first cathode 232, and the second anode 233; and the second electrode group 24 may include the third anode 241, the second cathode 242, and the fourth anode 243. The first cathode 232 may be a common cathode of the first anode 231 and the second anode 233. That is, the first anode 231 and the first cathode 232 may be selected to connect a light-emitting element of one color to drive such light-emitting element to emit light; or the second anode 233 and the first cathode 232 may be connected to a light-emitting element of another color to drive such light-emitting element to emit light. The second cathode 242 may be common cathode of the third anode 241 and the fourth anode 243. That is, the third anode 241 and the second cathode 242 may be selected to connect a light-emitting element of one color to drive such light-emitting element to emit light; or the fourth anode 243 and the second cathode 242 may be connected to a light-emitting element of another color to drive such light-emitting element to emit light.

In the first display panel 11, the first electrode group 23 and the second electrode group 24 may be sequentially arranged along the first direction; the first anode 231, the first cathode 232 and the second anode 233 may be arranged sequentially along the second direction; the third anode 241, the second cathode 242 and the fourth anode 243 may be arranged sequentially along the second direction; and the first anode 231 and the first cathode 232 may be electrically connected to the first-color light-emitting element, and the third anode 241 and the second cathode 242 may be electrically connected to the second-color light-emitting element.

In the second display panel 12, the first electrode group 23 and the second electrode group 24 may be arranged sequentially along a direction opposite to the first direction; the first anode 231, the first cathode 232 and the second anode 233 may be arranged sequentially along a direction opposite to the second direction; the third anode 241, the second cathode 242 and the fourth anode 243 may be arranged sequentially along the direction opposite to the second direction; and the fourth anode 243 and the second cathode 242 may be electrically connected to the first-color light-emitting element, and the second anode 233 and the first cathode 232 may be electrically connected to the second-color light-emitting element.

The first direction may be perpendicular to the second direction, and both the first direction and the second direction may be in parallel with the plane where the display panel is located.

It should be noted that, in the first display panel, the second anode and the fourth anode may be redundant electrodes; and in the second display panel, the first anode and the third anode may be redundant electrodes. Moreover, in the first display panel, the first anode and the third anode may be two first electrodes, and the second anode and the fourth anode may be two second electrodes; and in the second display panel, the first anode and the third anode may be two first electrodes, and the second anode and the fourth anode may be two second electrodes. It should also be noted that, in embodiments of the present disclosure, the first-color light-emitting element may be a red light-emitting element, and the second-color light-emitting element may be a blue light-emitting element, which may not be limited in the present disclosure and may be configured according to actual needs.

For example, in one embodiment, both the first display panel and the second display panel may include two electrode groups, and each electrode group may include two anodes and one cathode. In such way, each electrode group may drive light-emitting elements of two colors. Furthermore, when soldering the light-emitting elements on the display panel, light-emitting elements of different colors may be selectively soldered at the electrode positions of the first electrode group and the second electrode group based on display requirements of the spliced display panels, thereby solving the misalignment problem of the monochrome dots of the spliced display panels.

In addition, the display panel in the display apparatus provided by the present disclosure includes two electrode groups, and each electrode group may drive light-emitting elements of two colors, such that in the process of fabricating the display apparatus, the light-emitting elements of corresponding colors may be selectively bound according to display requirements of the display apparatus, and display panels with different substrates may not need to be fabricated. Therefore, the substrates of the display panels in the display apparatus provided by the present disclosure may all be same, and the fabricating process of the display panels in the display apparatus may be same, which may be beneficial for simplifying the fabricating process of the display apparatus.

On the basis of above-mentioned embodiments, in one embodiment of the present disclosure, referring to FIG. 5, in the first display panel 11, the direction pointing from the display region 20 to the binding region 30 may be the second direction, the first anode 231, the first cathode 232 and the second anode 233 may be arranged sequentially along the second direction, and the third anode 241, the second cathode 242 and the fourth anode 243 may be sequentially arranged along the second direction; and in the second display panel 12, the direction pointing from the display region 20 to the binding region 30 may be an direction opposite to the second direction, the first anode 231, the first cathode 232 and the second anode 233 may be arranged sequentially along the direction opposite to the second direction, and the third anode 241, the second cathode 242 and the fourth anode 243 may be sequentially arranged along the direction opposite to the second direction. Moreover, if the direction pointing from the display region in the first display panel to the binding region is defined as the direction from top to bottom, the first electrode group and the second electrode group may be arranged sequentially from left to right in the first display panel, and the first electrode group and the second electrode group may be arranged sequentially from right to left in the second display panel.

Figure 6:
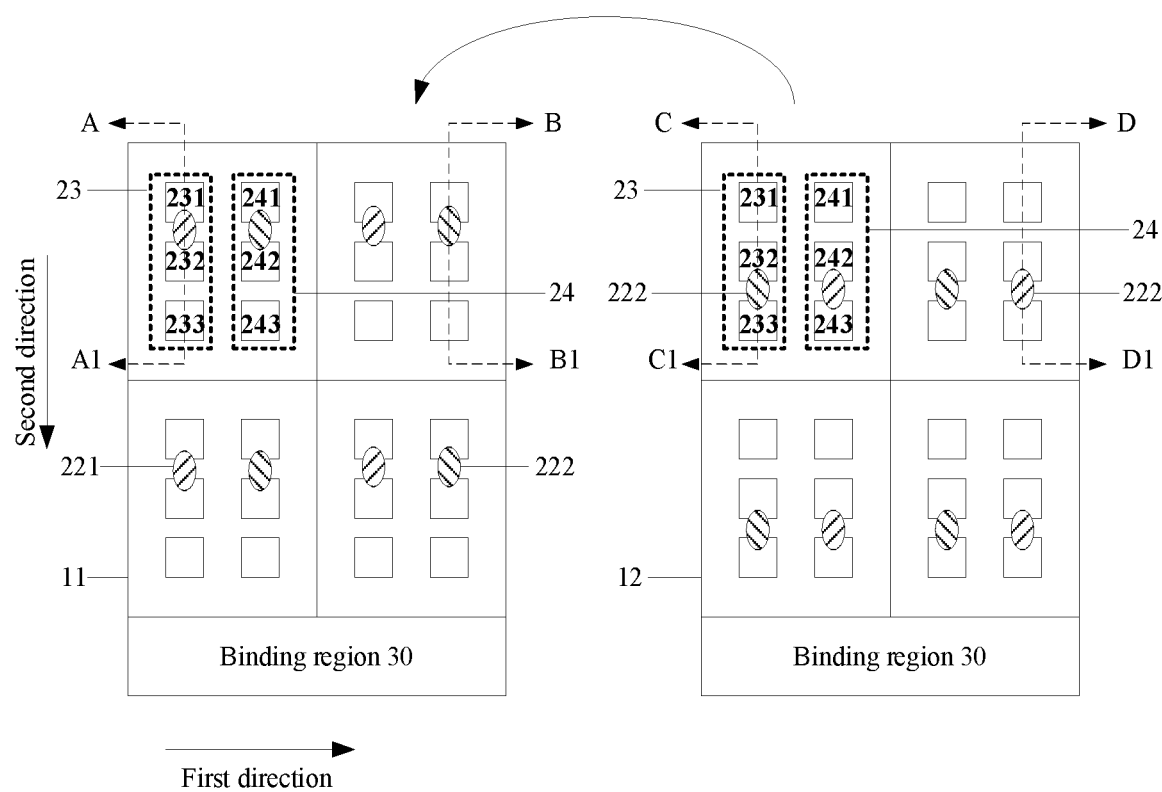
FIG. 6 illustrates an electrical connection schematic of light-emitting elements of each display panel in a display apparatus according to various embodiments of the present disclosure.

For example, in one embodiment, referring to FIG. 6, in the first display panel 11, the first anode 231 and the first cathode 232 of the first electrode group 23 may be electrically connected to the first-color light-emitting element 221, and the third anode 241 and the second cathode 242 in the second electrode group 24 may be electrically connected to the second-color light-emitting element 222; and in the second display panel 12, the second anode 233 and the first cathode 232 may be electrically connected to the second-color light-emitting element 222, and the fourth anode 243 and the second cathode 242 may be electrically connected to the first-color light-emitting element 221. Therefore, after the second display panel 12 is rotated 180° in its plane and spliced with the first display panel 11, the row or column of same color pixels of the formed display panel may not be deviated, that is, the spliced display panels may not have the misalignment problem of the monochromatic dots. In one embodiment, the structural schematic of the display apparatus formed by splicing the first display panel and the second display panel is shown in FIG. 5. It should be noted that when splicing the first display panel and the second display panel, the first display panel and the second display panel may be in a same plane and arranged sequentially along the first direction; and the second display panel may rotate 180° in its plane to be spliced with the first display panel, which indicates that the second display panel may rotate 180° counterclockwise in a same plane to be spliced with the first display panel.

Figure 7:
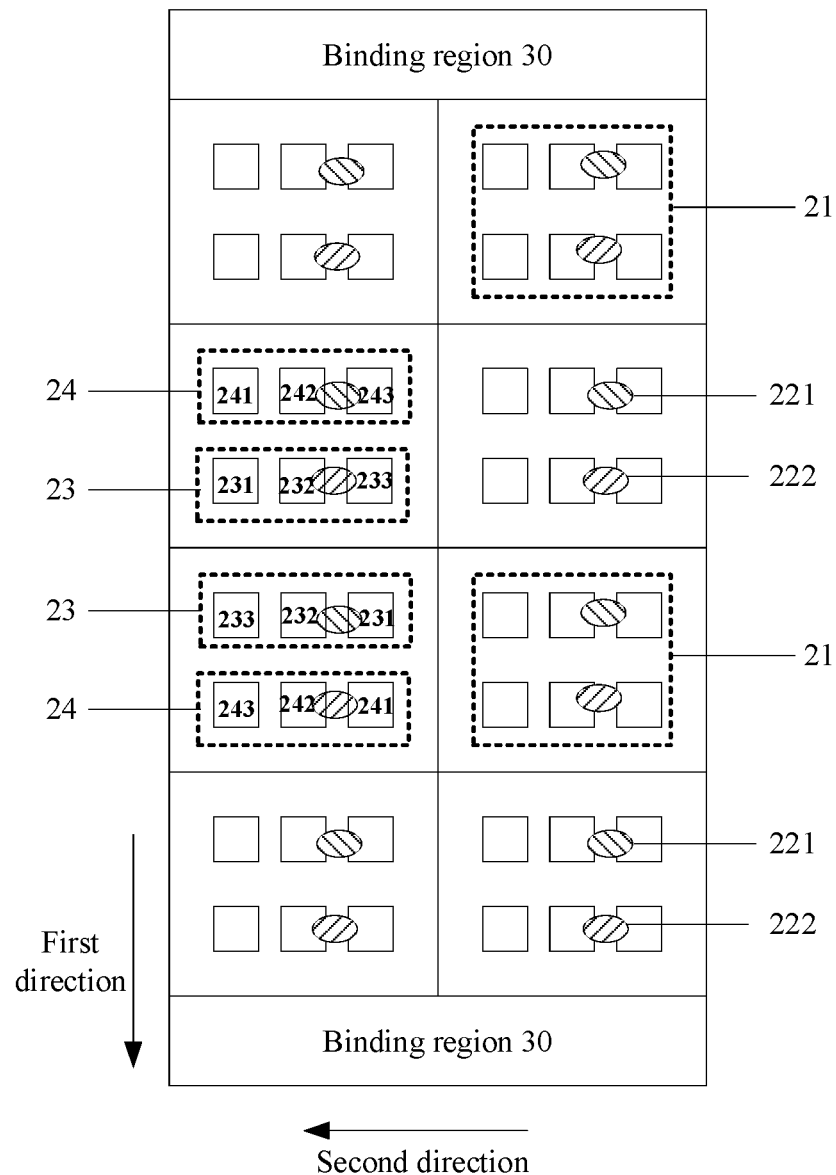
FIG. 7 illustrates a structural schematic of display panels in another display apparatus according to various embodiments of the present disclosure.

In another embodiment of the present disclosure, referring to FIG. 7, in the first display panel 11, the direction pointing from the display region 20 to the binding region 30 may be the first direction, and the first electrode group 23 and the second electrode groups 24 may be arranged sequentially along the first direction; and in the second display panel 12, the direction pointing from the display region 20 to the binding region 30 may be the direction opposite to the first direction, and the first electrode group 23 and the second electrode group 24 may be sequentially arranged along the direction opposite to the first direction. Moreover, if the direction pointing from the display region to the binding region in the first display panel is defined as the direction from top to bottom, in the first display panel, the first anode, the first cathode and the second anode may be arranged sequentially from left to right, and the third anode, the second cathode and the fourth anode may be arranged sequentially from left to right; and in the second display panel, the first anode, the first cathode and the second anode may be arranged sequentially from right to left, and the third anode, the second cathode and the fourth anode may be arranged sequentially from right to left.

Figure 8:
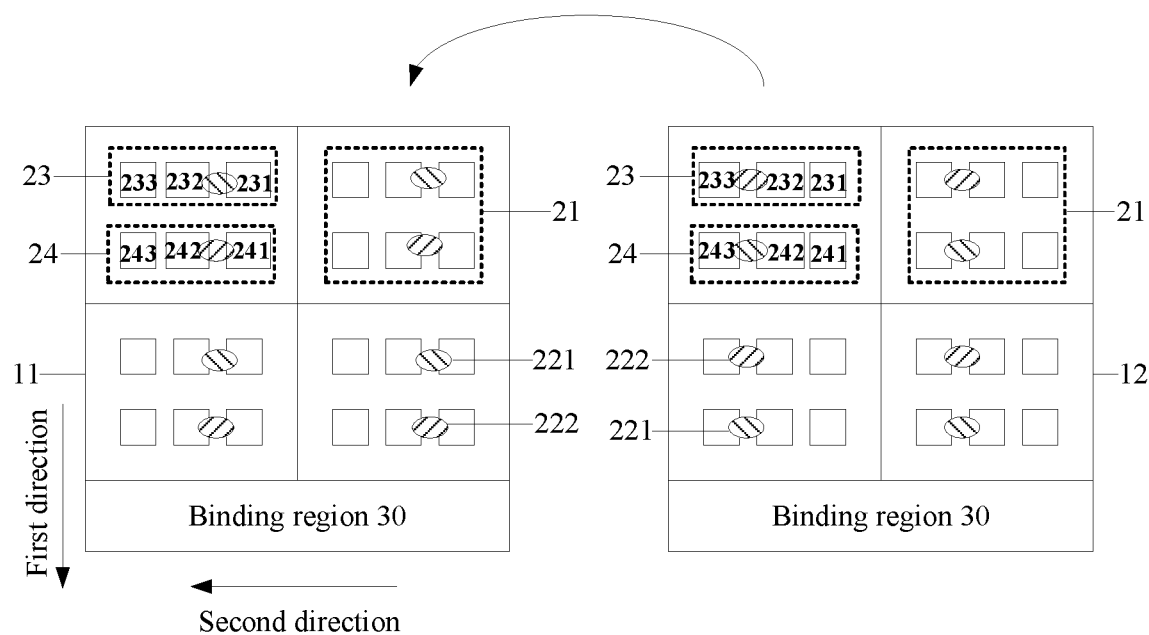
FIG. 8 illustrates an electrical connection schematic of light-emitting elements of each display panel in another display apparatus according to various embodiments of the present disclosure.

For example, in one embodiment, referring to FIG. 8, in the first display panel 11, the first anode 231 and the first cathode 232 of the first electrode group 23 may be electrically connected to the first-color light-emitting element 221, and the third anode 241 and the second cathode 242 in the second electrode group 24 may be electrically connected to the second-color light-emitting element 222; and in the second display panel 12, the second anode 233 and the first cathode 232 may be electrically connected to the second-color light-emitting element 222, and the fourth anode 243 and the second cathode 242 may be electrically connected to the first-color light-emitting element 221. Therefore, after the second display panel 12 is rotated by 180° and spliced with the first display panel 11, the row or column of same color pixels of the formed display panel may not be deviated, that is, the spliced display panels may not have the misalignment problem of the monochromatic dots. In one embodiment, the structural schematic of the display apparatus formed by splicing the first display panel and the second display panel is shown in FIG. 7.

Optionally, in one embodiment of the present disclosure, the light-emitting element may be a light-emitting diode (LED). That is, the first-color light-emitting element may be an LED, and the second-color light-emitting element may be an LED, which may not be limited in the present disclosure and may be configured according to actual needs. It should be noted that the first-color light-emitting element and the second-color light-emitting element may be micro-LEDs.

Figure 9:
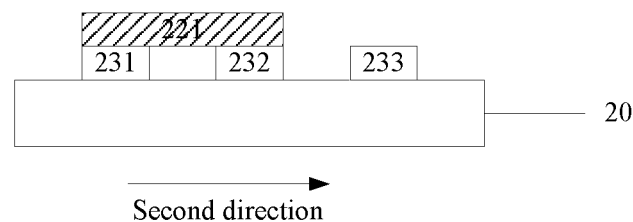
FIG. 9 illustrates a cross-sectional view along an AA1 direction in FIG. 6.
Figure 10:
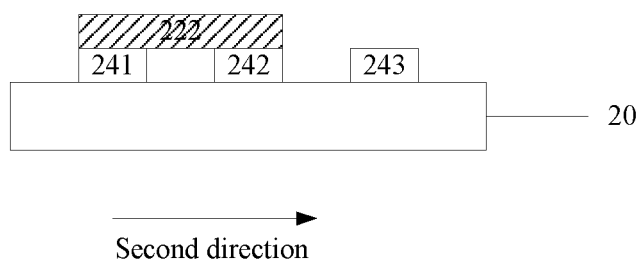
FIG. 10 illustrates a cross-sectional view along a BB1 direction in FIG. 6.
Figure 11:
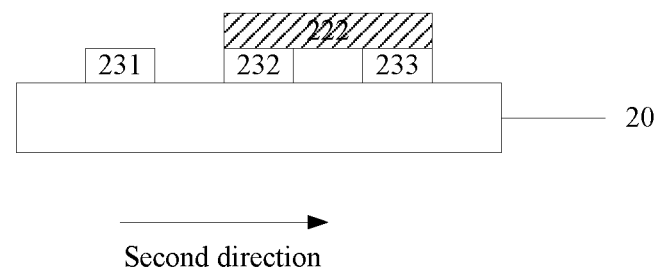
FIG. 11 illustrates a cross-sectional view along a CC1 direction in FIG. 6.
Figure 12:
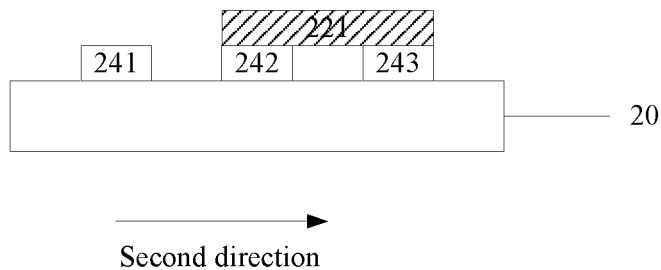
FIG. 12 illustrates a cross-sectional view along a DD1 direction in FIG. 6.

It should also be noted that the schematics of connecting the first-color light-emitting elements and the second-color light-emitting elements to the electrodes in the first display panel and the second display panel refer to FIGS. 9 to 12. FIG. 9 illustrates a cross-sectional view along an AA1 direction in FIG. 6. FIG. 10 illustrates a cross-sectional view along an BB1 direction in FIG. 6. FIG. 11 illustrates a cross-sectional view along an CC1 direction in FIG. 6. FIG. 12 illustrates a cross-sectional view along an DD1 direction in FIG. 6. For example, FIG. 9 is a schematic of the electrical connection between the first electrode group and the first-color light-emitting element in the first display panel, FIG.

10 is a schematic of the electrical connection between the second electrode group and the second-color light-emitting element in the first display panel, FIG. 11 is a schematic of the electrical connection between the first electrode group and the second-color light-emitting element in the second display panel, and FIG. 12 is a schematic of the electrical connection between the second electrode group and the first-color light-emitting element in the second display panel.

Figure 13:
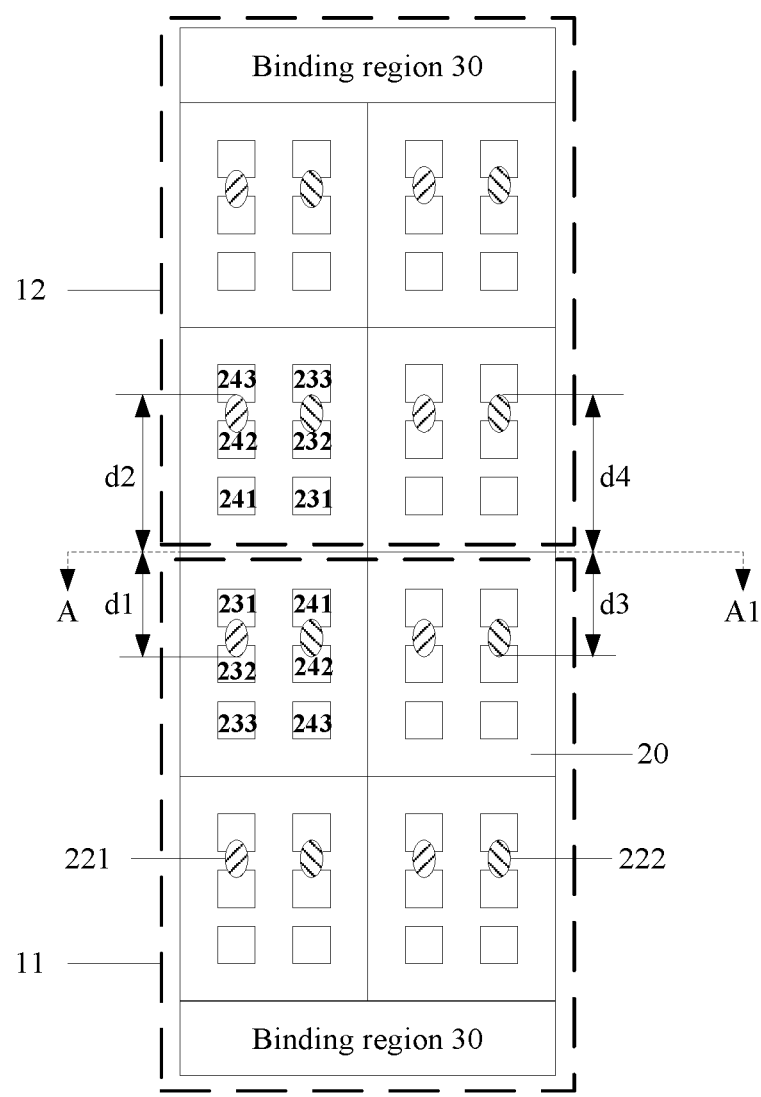
FIG. 13 illustrates a distance schematic of same light-emitting elements in a display apparatus according to various embodiments of the present disclosure.

On the basis of above-mentioned embodiments, in one embodiment of the present disclosure, in light-emitting elements on two sides of a splicing gap in the display apparatus, light-emitting elements of at least one same color may be asymmetrical with respect to the splicing gap; that is, in the display apparatus, the distances from the light-emitting elements of at least one color among the light-emitting elements on two sides of the splicing gap to the splicing gap may be different. For example, referring to FIG. 13, in the pixel column, where the first-color light-emitting element 221 is located, in the display region 20 of the display apparatus, the distance between the first-color light-emitting element 221 in the first display panel 11 and the splicing gap AA1 is d1, the distance between the first-color light-emitting elements 222 in the second display panel 12 and the splicing gap AA1 is d2, and d1≠d2; and in the pixel column, where the second-color light-emitting element 222 is located, in the display region 20 of the display apparatus, the distance between the second-color light-emitting element 222 in the first display panel 11 and the splicing gap AA1 is d3, the distance between the second-color light-emitting elements 222 in the second display panel 12 and the splicing gap AA1 is d4, and d3≠d4.

On the basis of above-mentioned embodiments, in one embodiment of the present disclosure, the first voltage difference may be between the first anode and the first cathode; the second voltage difference may be between the second anode and the first cathode; the second voltage difference may be between the third anode and the second cathode; and the first voltage difference may be between the fourth anode and the second cathode. The first voltage difference may be the drive voltage of the first-color light-emitting element, and the second voltage difference may be the drive voltage of the second-color light-emitting element, such that the electrodes may be electrically connected with light-emitting elements of different colors to be driven to emit light.

On the basis of above-mentioned embodiments, in one embodiment of the present disclosure, the distance between any two adjacent light-emitting elements in the display apparatus may be same. That is, the distance between any two adjacent light-emitting elements in the first display panel may be same, and the distance between any two adjacent light-emitting elements in the second display panel may be same. In addition, the distance between the light-emitting element adjacent to the splicing gap in the first display panel and the light-emitting element adjacent to the splicing gap in the second display panel may also be same as the distance between adjacent light-emitting elements in the first display panel and the second display panel. That is, in the display region of the display apparatus, in a same pixel column, the distance between two adjacent light-emitting elements may be same, and in the same pixel row, the distance between two adjacent light-emitting elements may be same, which may improve the display uniformity of the display apparatus.

Figure 14:
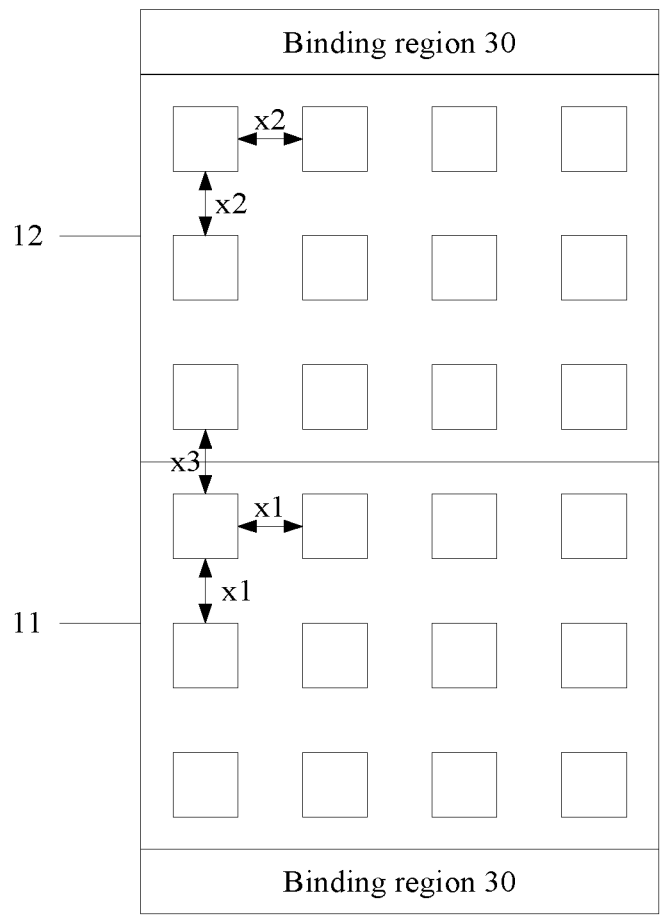
FIG. 14 illustrates a distance schematic of adjacent light-emitting elements in a display apparatus according to various embodiments of the present disclosure.

For example, referring to FIG. 14, the distance between any two adjacent light-emitting elements in the first display panel is x1, the distance between any two adjacent light-emitting elements in the second display panel is x2, the distance between the light-emitting element adjacent to the splicing gap in the first display panel and the light-emitting element adjacent to the splicing gap in the second display panel is x3, and x1=x2=x3.

Figure 15:
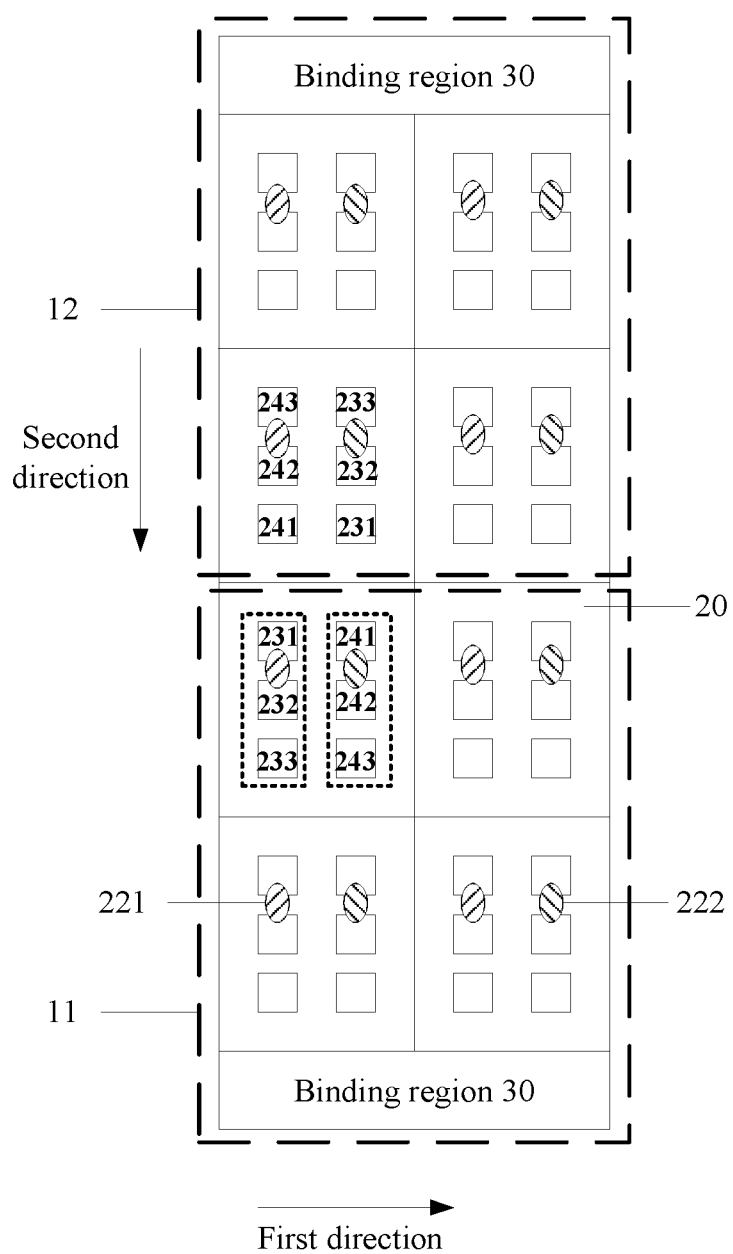
FIG. 15 illustrates a structural schematic of light-emitting elements in a display apparatus according to various embodiments of the present disclosure.

On the basis of above-mentioned embodiments, in one embodiment of the present disclosure, as shown in FIG. 15, the binding regions 30 in the display apparatus may be arranged sequentially along the second direction, that is, the arrangement direction of the binding regions 30 in the display apparatus may be in parallel with the arrangement direction of the electrodes in the electrode groups. It is known that in the display region 20 of the display apparatus, the electrode groups may be arranged along the first direction. Therefore, in the display region 20 of the display apparatus, the first-color light-emitting elements 221 and the second-color light-emitting elements 222 may be alternately and repeatedly arranged one after another along the first direction.

Figure 16:
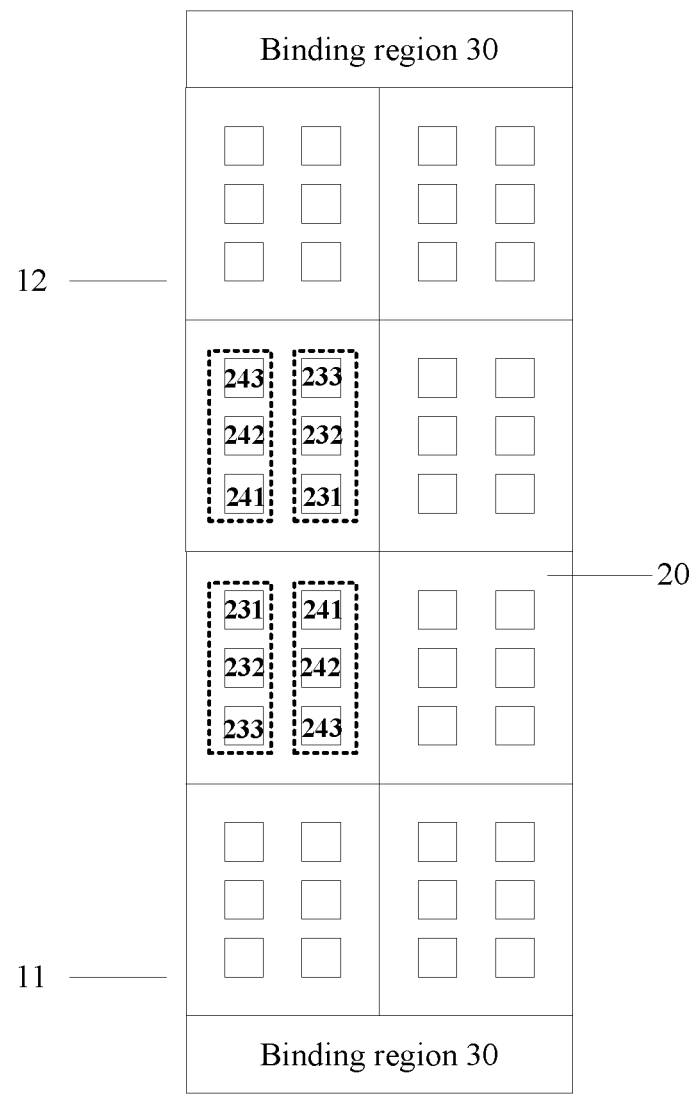
FIG. 16 illustrates a structural schematic of each electrode group in a display apparatus according to various embodiments of the present disclosure.

On the basis of above-mentioned embodiments, in one embodiment of the present disclosure, as shown in FIG. 16, in the first display panel 11 and the second display panel 12, the first anode 231 may be on the side of the first cathode 232 adjacent to the splicing gap, and the second anode 233 may be on the side of the first cathode 232 away from the splicing gap. Since the first electrode group 23 and the second electrode group 24 are arranged in parallel along the first direction, the third anode 241 may be on the side of the second cathode 242 adjacent to the splicing gap, and the fourth anode 243 may be on the side of the second cathode 242 away from the splicing gap.

Figure 17:
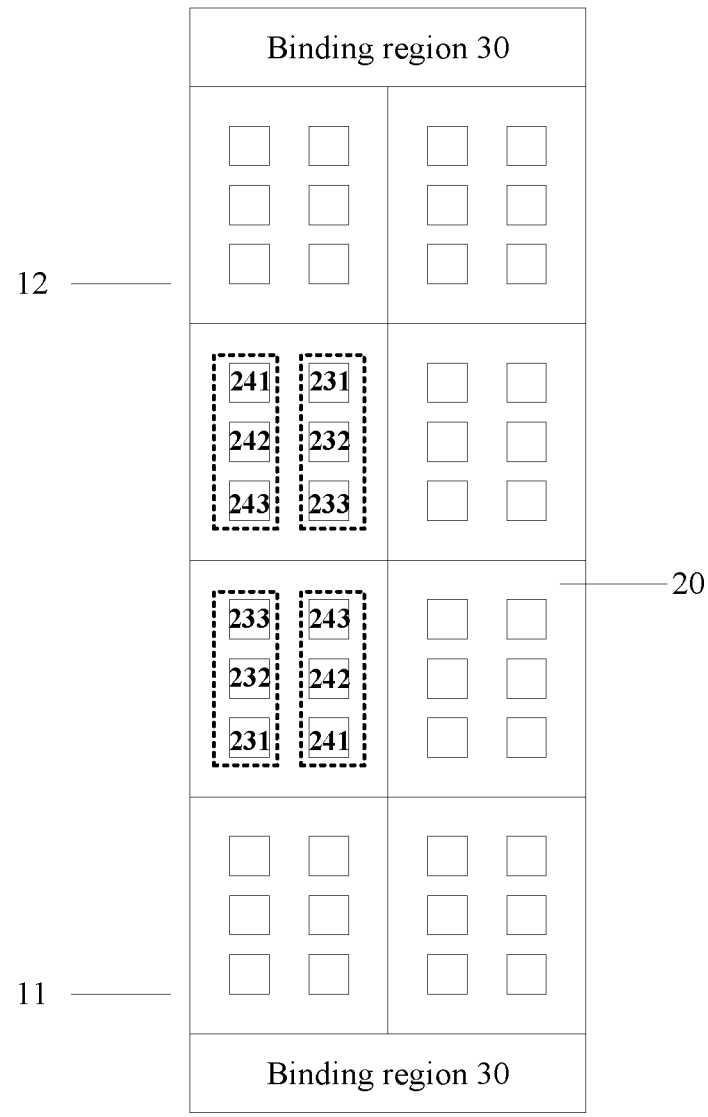
FIG. 17 illustrates a structural schematic of each electrode group in another display apparatus according to various embodiments of the present disclosure.

In another embodiment of the present disclosure, as shown in FIG. 17, in the first display panel 11 and the second display panel 12, the first anode 231 may be on the side of the first cathode 232 away from the splicing gap, and the second anode 233 may be on the side of the first cathode 232 adjacent to the splicing gap. Similarly, the third anode 241 may be on the side of the second cathode 242 away from the splicing gap, and the fourth anode 243 may be on the side of the second cathode 242 adjacent to the splicing gap.

It should be noted that, in above two embodiments, referring to FIGS. 16 and 17, the redundant electrodes may be also regularly distributed, and the redundant electrodes may be arranged sequentially along the arrangement direction of the electrode groups. Redundant electrodes in the first display panel may be the second anode and the fourth anode; and the redundant electrodes in the second display panel may be the first anode and the third anode.

Figure 18:
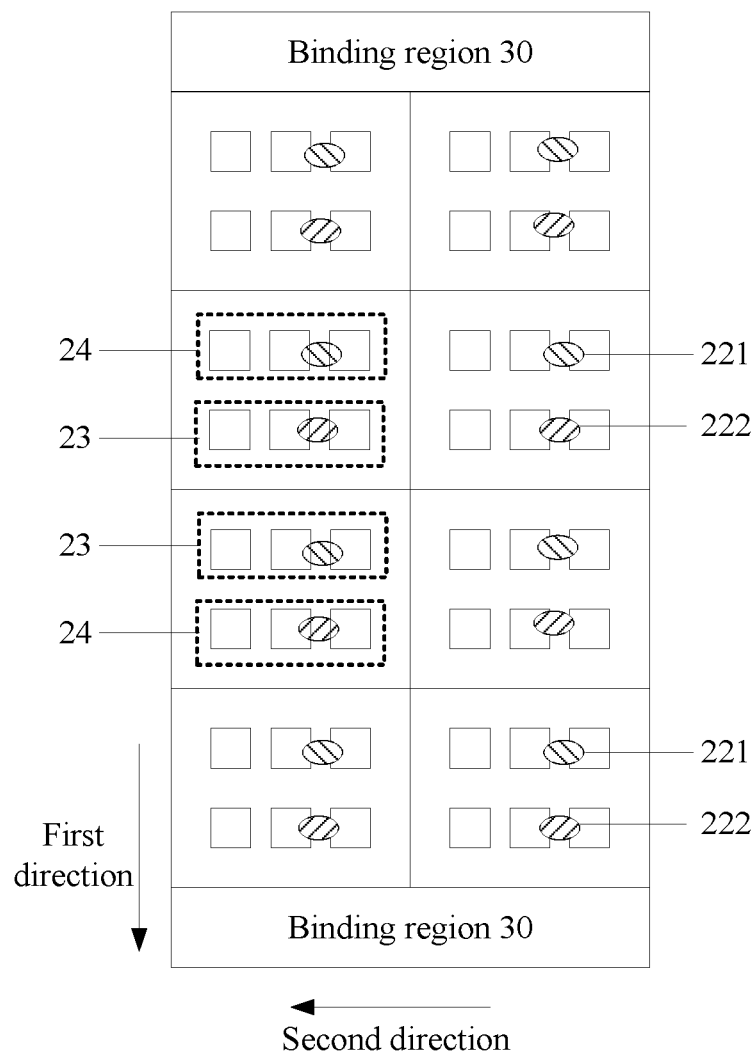
FIG. 18 illustrates a structural schematic of light-emitting elements in another display apparatus according to various embodiments of the present disclosure.

Referring to FIG. 18, in one embodiment of the present disclosure, the binding regions 30 in the display apparatus may be arranged along the first direction, that is, the arrangement direction of the binding regions 30 in the display apparatus may be in parallel with the arrangement direction of the electrode groups. In addition, it is known that in the display region 20 of the display apparatus, the electrode groups may be arranged along the first direction. Therefore, in the display region 20 of the display apparatus, the first-color light-emitting elements 221 and the second-color light-emitting elements 222 may be alternately and repeatedly arranged on after another along the first direction.

Figure 19:
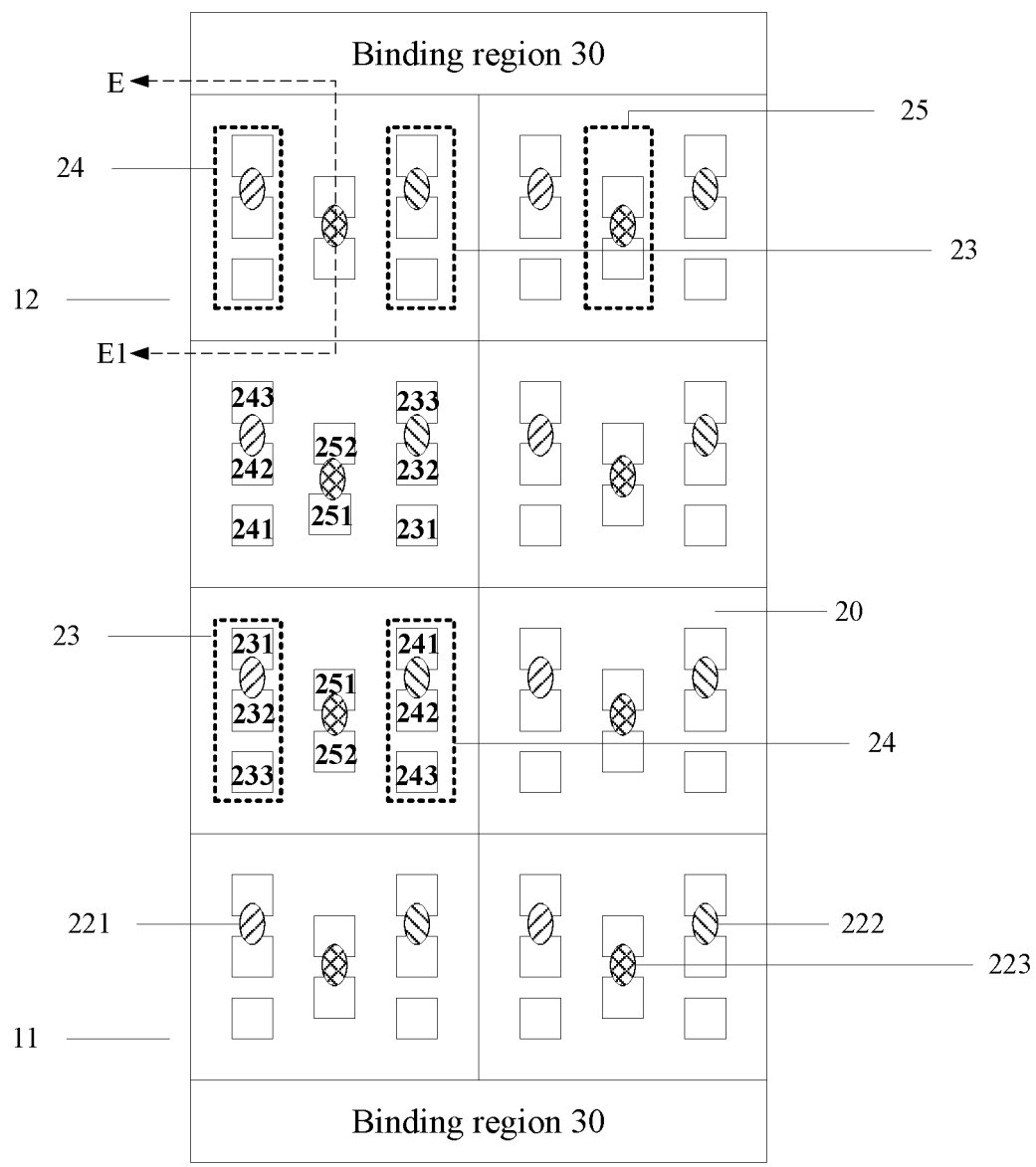
FIG. 19 illustrates another structural schematic of a display apparatus according to various embodiments of the present disclosure.
Figure 20:
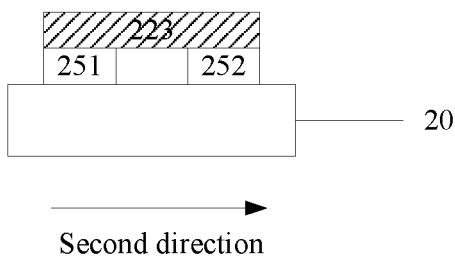
FIG. 20 illustrates a cross-sectional view along an EE1 direction in FIG. 19.

On the basis of above-mentioned embodiments, in one embodiment of the present disclosure, as shown in FIG. 19, the display panel may further include the third electrode group 25 between the first electrode group 23 and the second electrode group 24, and the third electrode group 25 may include the fifth anode 251 and the third cathode 252; the light-emitting elements may further include the third-color light-emitting element 223 between the first-color light-emitting element 221 and the second-color light-emitting element 222; and the fifth anode 251 and the third cathode 252 may be electrically connected to the third-color light-emitting element 223. Referring to FIG. 20, FIG. 20 illustrates a cross-sectional view along an EE1 direction in FIG. 19. FIG. 19 illustrates a schematic of the connection between the third-color light-emitting element and each electrode in the third electrode group.

Optionally, in one embodiment of the present disclosure, the third-color light-emitting element may be a green-light-emitting element, such that the first-color light-emitting elements, the second-color light-emitting elements and the third-color light-emitting elements may be combined to generate white light. However, the present disclosure may not limit the color of the third-color light-emitting elements; and the third-color light-emitting elements may also be light-emitting elements of other colors and may be configured according to actual needs.

On the basis of above-mentioned embodiments, in one embodiment of the present disclosure, the third voltage difference may be between the fifth anode and the third cathode and may be the drive voltage of the third-color light-emitting element, such that the third cathode and the fifth anode may drive the third-color light-emitting element. It should be noted that, in embodiments of the present disclosure, the first voltage difference, the second voltage difference and the third voltage difference may be drive voltages of light-emitting elements when light-emitting elements of different colors in the display apparatus are combined to generate white light.

Figure 21:
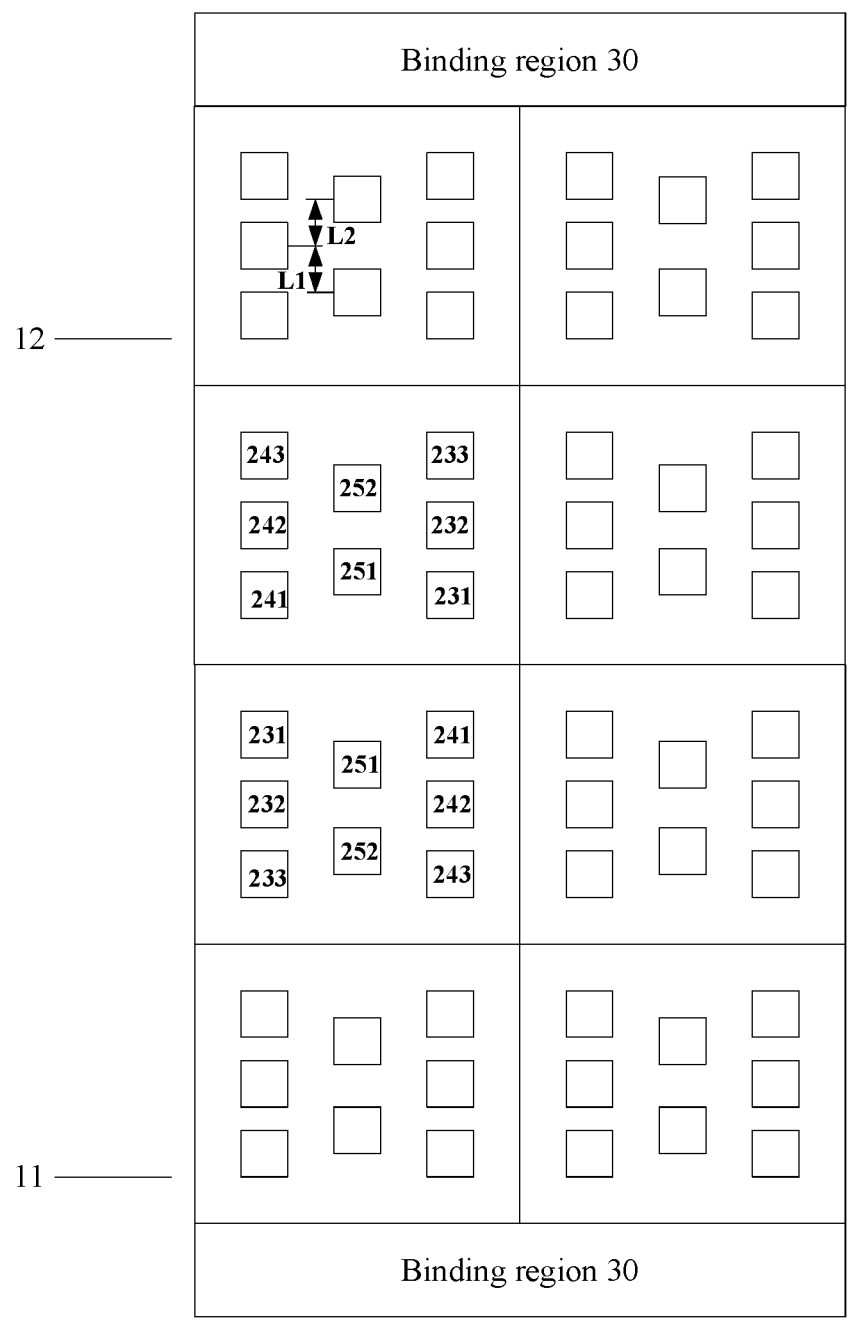
FIG. 21 illustrates a schematic of a distance between a first cathode and each of a third cathode and a fifth anode in a display panel of a display apparatus according to various embodiments of the present disclosure.

On the basis of above-mentioned embodiments, in one embodiment of the present disclosure, as shown in FIG. 21, along the second direction, the first distance L1 may be between the first cathode 232 and the fifth anode 252, the second distance L2 may be between the first cathode 232 and the third cathode 252, and the first distance L1 may be same as the second distance L2. Therefore, along the second direction, the first cathode 232 may correspond to the middle position of the third electrode group. Furthermore, whether the first anode 231 in the first electrode group is connected to the light-emitting element or the second anode 233 is connected to the light-emitting element, the distances between the light-emitting elements connected to the first electrode group and the light-emitting elements connected to the third electrode group may be same along the second direction. It is known from above-mentioned embodiments that the first electrode group and the second electrode group may be arranged in parallel along the first direction. Similarly, whether the third anode in the second electrode group is connected to the light-emitting element or the fourth anode is connected to the light-emitting element, the distances between the light-emitting elements connected to the second electrode group and the light-emitting elements connected to the third electrode group may also be same along the second direction, which may be beneficial for improving the display uniformity of the display apparatus.

Figure 22:
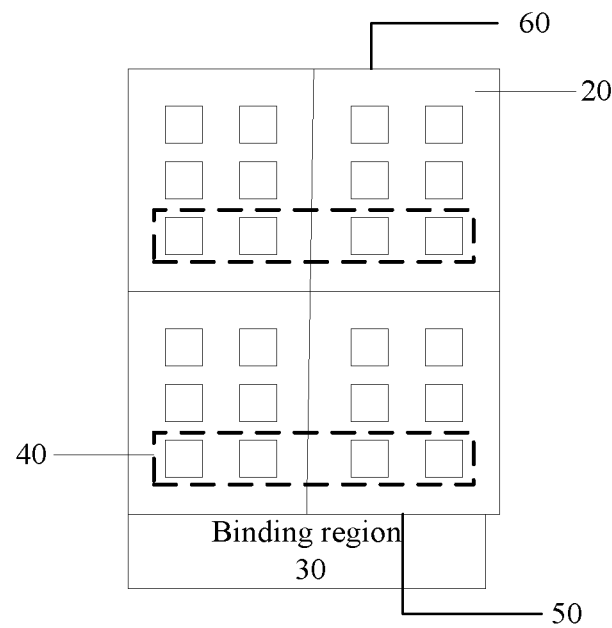
FIG. 22 illustrates a structural schematic of a display panel according to various embodiments of the present disclosure.

Correspondingly, the present disclosure also provides a display panel, which may be applied to the display apparatus described in any one of above-mentioned embodiments. As shown in FIG. 22, the display panel may include the display region 20 and the binding region 30. The display region 20 may include first and second sides which are opposite to each other; and the binding region 30 may be on the first side 50 of the display region 20. The display panel may include redundant electrodes 40.

It should be noted that above display apparatus may be formed by splicing at least two display panels. For example, the second sides of the display regions of the display panels may be spliced with each other, and the binding regions may be on two sides of the splicing gap. That is, when fabricating above-mentioned display apparatus, a part of the display panels may need to be rotated by 180° to be spliced with another part of the display panels.

If rotated display panel is directly spliced with another display panel, the display region of the display apparatus formed after splicing may have the misalignment problem of the monochromatic dots. However, the display panel provided in the present disclosure may include redundant electrodes, which may indicate that in addition to the electrodes electrically connected to the light-emitting elements, the display panel may also include electrodes not connected to the light-emitting elements. Different electrodes may be electrically connected to light-emitting elements of different colors, which may indicate that the display panel may have the plurality of electrodes capable of being electrically connected with light-emitting elements of different colors. Therefore, when using the display panels to prepare the display apparatus, according to display requirements of the display apparatus, light-emitting elements of corresponding colors may be selectively soldered on the display panels, thereby avoiding the misalignment problem of the monochromatic dots in formed display panels.

In addition, the display panels may include redundant electrodes, such that in the process of using the display panels to prepare the display apparatus, according to display requirements of the display apparatus, different light-emitting elements may be selectively soldered in different display panels without refabricating another display panel, which may be beneficial for simplifying the fabrication process of the display apparatus.

Figure 23:
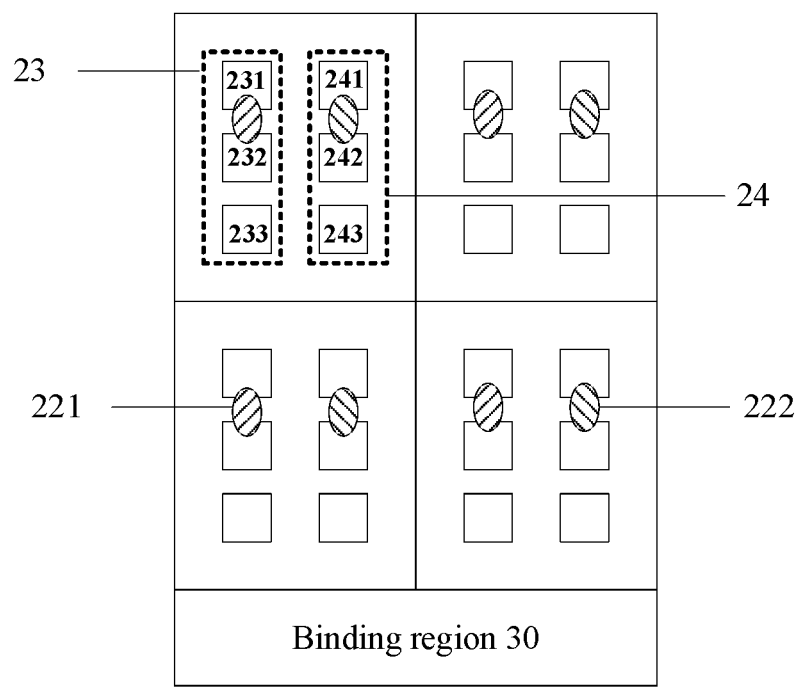
FIG. 23 illustrates a structural schematic of each electrode unit in a display panel according to various embodiments of the present disclosure.

On the basis of above-mentioned embodiments, in one embodiment of the present disclosure, as shown in FIG. 23, the display panel may further include light-emitting elements in the display region 20 and include the plurality of electrode units 21 arranged in an array in the display region 20; the light-emitting elements may include the first-color light-emitting elements 221 and the second-color light-emitting elements 222; the electrode unit 21 may include the first electrode group 23 and the second electrode group 24; the first electrode group 23 may include the first anode 231, the first cathode 232 and the second anode 233; and the second electrode group 24 may include the third anode 241, the second cathode 242 and the fourth anode 243.

The first anode 231 and the first cathode 232 may be electrically connected to the first-color light-emitting element 221; and the third anode 241 and the second cathode 242 may be electrically connected to the second-color light-emitting element 222.

Figure 24:
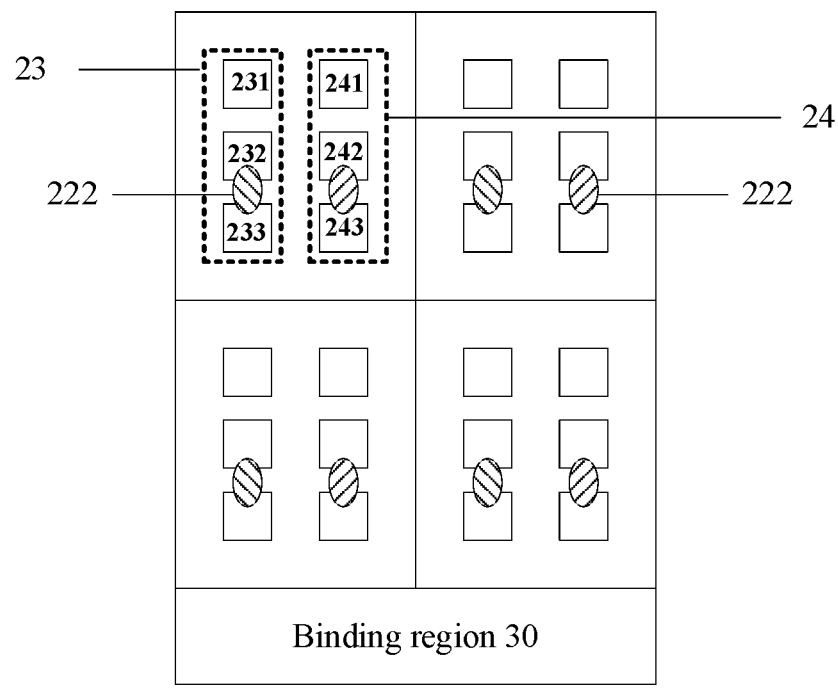
FIG. 24 illustrates a structural schematic of each electrode unit in another display panel according to various embodiments of the present disclosure.

Or as shown in FIG. 24, the second anode 233 and the first cathode 232 may be electrically connected to the second-color light-emitting element 222; and the fourth anode 243 and the second cathode 242 may be electrically connected to the first-color light-emitting element 221.

For example, in embodiments of the present disclosure, the display panel may include two electrode groups, and each electrode group may include two anodes and one cathode, such that each electrode group may drive light-emitting elements of two colors. Furthermore, when soldering light-emitting elements on the display panels, light-emitting elements of different colors may be selectively soldered at electrical connection positions of the first electrode group and the second electrode group based on display requirements of the spliced display panels, thereby solving the misalignment problem of the monochrome dots of the spliced display panels.

Moreover, the display panel provided by the present disclosure includes two electrode groups, each electrode group may drive light-emitting elements of two colors. Therefore, in the process of fabricating the display apparatus, according to display requirements of the display apparatus, light-emitting elements of corresponding colors may be selectively bound in the display panel, and display panels with different substrates may not need to be fabricated, thereby being beneficial for simplifying the fabricating process of the display apparatus.

On the basis of above-mentioned embodiments, in one embodiment of the present disclosure, the first voltage difference may be between the first anode and the first cathode, the second voltage difference may be between the second anode and the first cathode, the second voltage difference may be between the third anode and the second cathode, and the first voltage difference may be between the fourth anode and the second cathode. The first voltage difference may be the drive voltage of the first-color light-emitting element, and the second voltage difference may be the drive voltage of the second-color light-emitting element. Therefore, according to display requirements of the display apparatus, the light-emitting elements of different colors may be soldered with corresponding electrodes to drive such light-emitting elements to emit light.

Figure 25:
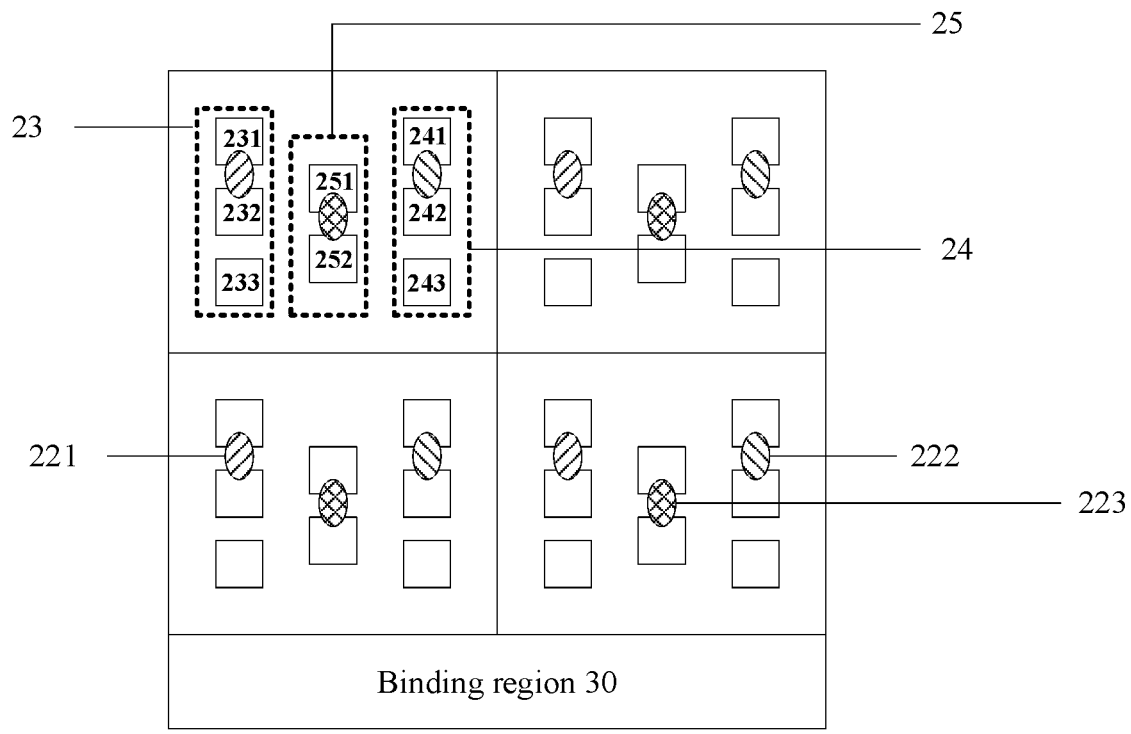
FIG. 25 illustrates another structural schematic of another display panel according to various embodiments of the present disclosure.

On the basis of above-mentioned embodiments, in one embodiment of the present disclosure, as shown in FIG. 25, the display panel may further include the third electrode group 25 between the first electrode group 23 and the second electrode group 24; the third electrode group 25 may include the fifth anode 251 and the third cathode 252; the light-emitting elements may further include the third-color light-emitting element 223 between the first-color light-emitting element 221 and the second-color light-emitting element 222; and the fifth anode 251 and the third cathode 252 may be electrically connected to the third-color light-emitting element 223.

On the basis of above-mentioned embodiments, in one embodiment of the present disclosure, the third voltage difference may be between the fifth anode and the third cathode and may be the drive voltage of the third-color light-emitting element, such that the third cathode and the fifth anode may drive the third-color light-emitting element.

It should be noted that, in one embodiment of the present disclosure, the first-color light-emitting element may be the red-light-emitting element, the second-color light-emitting element may be the blue-light-emitting element, and the third-color light-emitting element may be the green-light-emitting element. The first voltage difference, the second voltage difference and the third voltage difference may be the drive voltages of all light-emitting elements when the light-emitting elements of three colors in the display apparatus are combined to generate white light.

Figure 26:
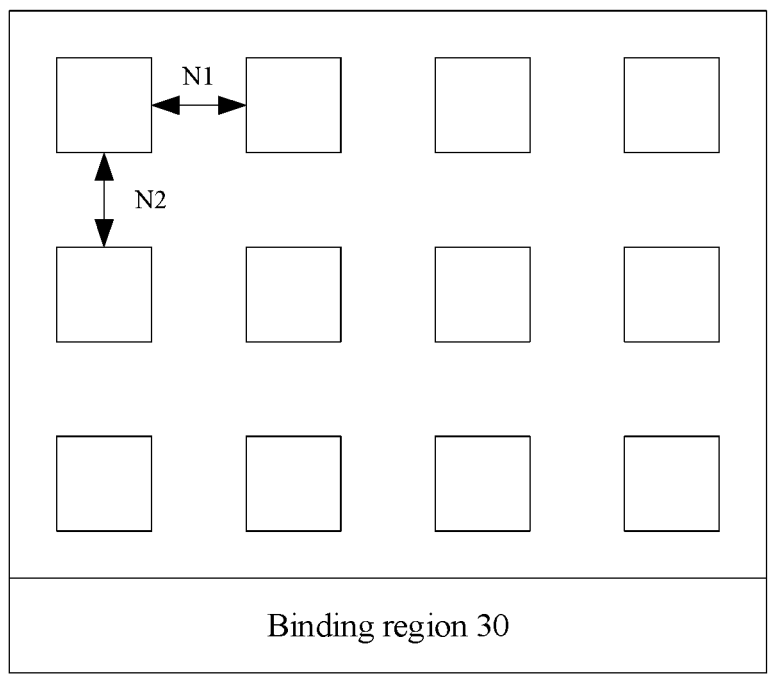
FIG. 26 illustrates a distance schematic of adjacent light-emitting elements in a display panel according to various embodiments of the present disclosure.

Moreover, after the light-emitting elements are connected in the display panel, the distance between any two adjacent light-emitting elements may be same. For example, referring to FIG. 26, along the arrangement direction of the electrode groups, the distance between any two adjacent light-emitting elements is N1; and along the arrangement direction of the electrodes in the electrode group, the distance between any two adjacent light-emitting elements is N2, and N1=N2, which may be beneficial for improving the display uniformity of the display panel.

Figure 27:
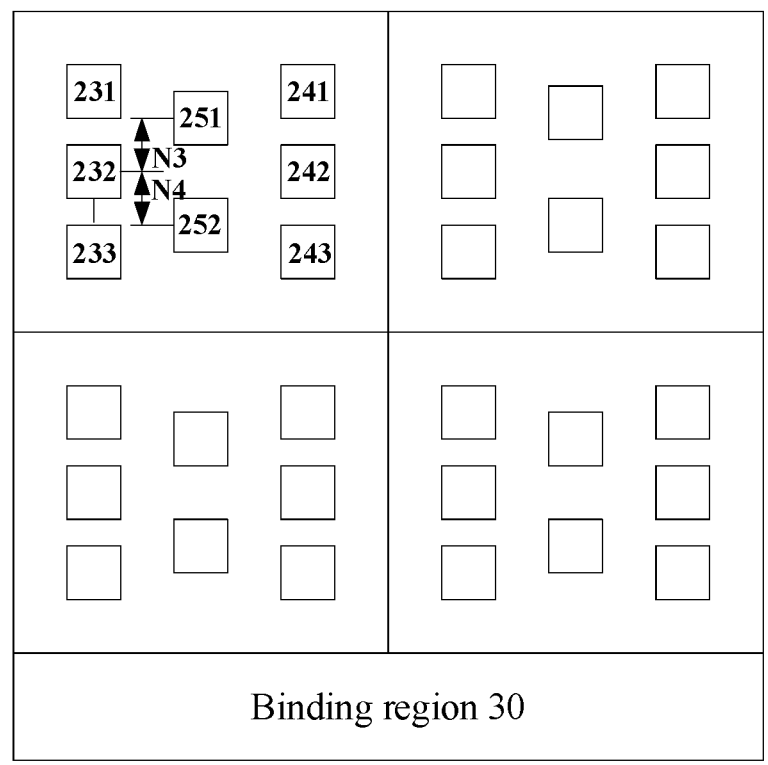
FIG. 27 illustrates a schematic of a distance between a first cathode and each of a third cathode and a fifth anode in a display panel according to various embodiments of the present disclosure.

On the basis of above-mentioned embodiments, in one embodiment of the present disclosure, as shown in FIG. 27, along the arrangement direction of the electrodes, the first distance N3 may be between the first cathode 232 and the fifth anode 252, the second distance N4 may be between the first cathode and the third cathode, and the first distance N3 may be same as the second distance N4. Therefore, along the arrangement direction of the electrodes, the first cathode 232 may correspond to the middle position of the third electrode group. Furthermore, whether the first anode in the first electrode group is connected to the light-emitting element or the second anode is connected to the light-emitting element, along the arrangement direction of the electrodes, the distances between the light-emitting elements connected to the first electrode group and the light-emitting elements connected to the third electrode group may be same. It is known from above-mentioned embodiments that the first electrode group and the second electrode group may be arranged in parallel along the first direction. Similarly, whether the third anode in the second electrode group is connected to the light-emitting element or the fourth anode is connected to the light-emitting element, along the second direction, the distances between the light-emitting elements connected to the second electrode group and the light-emitting elements connected to the third electrode group may also be same, which may be beneficial for improving the display uniformity of the display panel.

As disclosed above, the present disclosure provides the display apparatus and the display panel. The display apparatus may include the display panels; the display panel may include the display region and the binding region; the display region may include first and second sides which are opposite to each other; the binding region may be the first side of the display region of the display panel; the display panel may include the first display panel and the second display panel; and the second side of the first display panel may be spliced with the second side of the second display panel to form the display apparatus with a relatively large display region.

Moreover, the display panels may include redundant electrodes, that is, the first display panel and the second display panel may include electrodes not electrically connected to the light-emitting elements in addition to the electrodes electrically connected to the light-emitting elements. Since different electrodes are electrically connected to light-emitting elements of different colors, both the first display panel and the second display panel may include electrodes capable of being electrically connected with light-emitting elements of different colors. Therefore, when fabricating the display apparatus, according to display requirements of the display apparatus, light-emitting elements of corresponding colors may be selectively soldered on the first display panel and the second display panel, thereby avoiding the misalignment problem of the monochromatic dots in spliced display panels.

In addition, the first display panel and the second display panel may include redundant electrodes. Therefore, the light-emitting elements of corresponding colors may be soldered on different electrodes of the first display panel and the second display panel according to display requirements of the display apparatus when fabricating the display apparatus, and the light-emitting elements may be spliced together; and two display panels with different substrates may not need to be fabricated. In such way, display panels with same substrates may only need to be used, which may be beneficial for simplifying the fabricating process of the display apparatus.

From above-mentioned embodiments, it may be seen that the display apparatus and the display panel provided by the present disclosure may achieve at least following beneficial effects.

The display apparatus provided in the present disclosure may include display panels. The display panels may include the first display panel and the second display panel. The display panels may include redundant electrodes. That is, in the first display panel and the second display panel, in addition to electrodes electrically connected to the light-emitting elements, electrodes not electrically connected to the light-emitting elements may also be included. Different electrodes may be electrically connected to the light-emitting elements of different colors. In such way, the first display panel and the second display panel may include the plurality of electrodes capable of being electrically connected to the light-emitting elements of different colors. That is, the first display panel and the second display panel may the light-emitting elements of multiple colors. Therefore, when the first display panel and the second display panel are spliced to fabricate the display apparatus, according to display requirements of the display apparatus, the light-emitting elements of corresponding colors may be selectively soldered on the first display panel and the second display panel, thereby avoiding the misalignment problem of the monochromatic dots in the spliced display panel.

In addition, the display panels may include redundant electrodes. Therefore, when fabricating the display apparatus, according to display requirements of the display apparatus, the electrodes in the first display panel and the second display panel may be selectively soldered with the light-emitting elements of corresponding colors; and two display panels may be spliced together. Therefore, there is no need to fabricate the display panels with different substrates, and the display panels with same substrates may be used, thereby simplifying the fabricating process of the display apparatus.

Various embodiments in the present disclosure may be described in a progressive manner, a parallel manner, or a combination of progressive and parallel manners. Each embodiment may focus on the differences from other embodiments; and same and similar parts between various embodiments may be referred to each other. Since the apparatus disclosed in embodiments correspond to the method disclosed in embodiments, the description may be relatively simple, and relevant part may be referred to the description of the method.

It should be noted that the orientation or positional relationship indicated by the terms "upper", "lower", "top", "bottom", "inner", "outer" and the like may be based on the orientation or positional relationship shown the drawings. The orientation or positional relationship may only for the convenience of describing the present disclosure and simplifying the description, rather than indicate or imply that the apparatus or element referred to must have a particular orientation and be constructed and operated in a particular orientation. Therefore, the orientation or positional relationship should not be understood as the limitation of the present disclosure. When a component is considered to be "connected" to another component, it may be directly connected to the other component or there may be an intermediate component between the component and the other component.

It should also be noted that in the present disclosure, relational terms such as first and second may be used only to distinguish one entity or operation from another and may not necessarily require or imply that such actual relationship or order is between those entities or operations. Moreover, the terms "include", "contain" or any other variation thereof are intended to encompass a non-exclusive inclusion, such that an article or device including a list of elements may not only include those elements, but also other elements not expressly listed, or also include elements inherent to the article or device. Without further limitation, an element defined by the phrase "includes a . . . " may not preclude the presence of additional identical elements in an article or device that includes above-mentioned element.

Above description of disclosed embodiments may enable those skilled in the art to make or use the present disclosure. Various modifications to these embodiments may be readily apparent to those skilled in the art, and generic principles defined herein may be implemented in other embodiments without departing from the spirit or scope of the present disclosure. Therefore, the present disclosure may not be limited according to embodiments in the present disclosure but may be consistent with the widest scope of the principles and novelty features disclosed in the present disclosure.

What is claimed is:

1. A display apparatus, comprising:
a plurality of display panels, wherein:
   a display panel of the plurality of display panels includes a display region and a binding region;
   the display region includes a first side and a second side which are opposite to each other;
   the binding region is on the first side;
   the plurality of display panels includes a first display panel and a second display panel; and
   a second side of the first display panel is spliced with a second side of the second display panel, wherein the plurality of display panels includes redundant electrodes,
wherein a redundant electrode is one of a pair of anodes disposed on two opposite sides of a cathode, and the redundant electrode is not connected to a light-emitting element while the remaining one of the pair of the anodes and the cathode are connected to a light-emitting element.

2. The display apparatus according to claim 1, wherein:
binding regions of the display apparatus are symmetrical with respect to a splicing gap.

3. The display apparatus according to claim 1, wherein:
in light-emitting elements on two sides of a splicing gap in the display apparatus, light-emitting elements of at least one same color are asymmetrical with respect to the splicing gap.

4. A display apparatus, comprising
a plurality of display panels, wherein:
   a display panel of the plurality of display panels includes a display region and a binding region;
   the display region includes a first side and a second side which are opposite to each other;
   the binding region is on the first side;
   the plurality of display panels includes a first display panel and a second display panel;
   a second side of the first display panel is spliced with a second side of the second display panel, wherein the plurality of display panels includes redundant electrodes;
   the display panel includes light-emitting elements and a plurality of electrode units which is arranged in an array in the display region, wherein the light-emitting elements include a first-color light-emitting element and a second-color light-emitting element; an electrode unit of the plurality of electrode units includes a first electrode group and a second electrode group; the first electrode group includes a first anode, a first cathode and a second anode; and the second electrode group includes a third anode, a second cathode and a fourth anode;

in the first display panel, the first electrode group and the second electrode group are sequentially arranged along a first direction; the first anode, the first cathode and the second anode are arranged sequentially along a second direction; the third anode, the second cathode and the fourth anode are arranged sequentially along the second direction; the first anode and the first cathode are electrically connected to the first-color light-emitting element; and the third anode and the second cathode are electrically connected to the second-color light-emitting element; and in the second display panel, the first electrode group and the second electrode group are arranged along a direction opposite to the first direction; the first anode, the first cathode and the second anode are arranged sequentially along a direction opposite to the second direction; the third anode, the second cathode and the fourth anode are arranged sequentially along the direction opposite to the second direction; the fourth anode and the second cathode are electrically connected to the first-color light-emitting element; and the second anode and the first cathode are electrically connected to the second-color light-emitting element, wherein:

the first direction is perpendicular to the second direction; and both the first direction and the second direction are in parallel with a plane of the display panel.

5. The display apparatus according to claim 4, wherein: the light-emitting elements are light-emitting diodes.

6. The display apparatus according to claim 4, wherein: a first voltage difference is between the first anode and the first cathode; a second voltage difference is between the second anode and the first cathode; the second voltage difference is between the third anode and the second cathode; and the first voltage difference is between the fourth anode and the second cathode, wherein:

the first voltage difference is a drive voltage of the first-color light-emitting element, and the second voltage difference is a drive voltage of the second-color light-emitting element.

7. The display apparatus according to claim 4, wherein: a distance between any two adjacent light-emitting elements of the light-emitting elements in the display apparatus is same.

8. The display apparatus according to claim 4, wherein: binding regions in the display apparatus are arranged along the second direction; and first-color light-emitting elements and second-color light-emitting elements are alternately and repeatedly arranged one after another along the first direction.

9. The display apparatus according to claim 8, wherein: in the first display panel and the second display panel, the first anode in a same electrode group is on a side of the first cathode adjacent to a splicing gap, and the second anode is on a side of the first cathode away from the splicing gap.

10. The display apparatus according to claim 8, wherein: in the first display panel and the second display panel, the first anode is on a side of the first cathode away from a splicing gap, and the second anode is on a side of the first cathode adjacent to the splicing gap.

11. The display apparatus according to claim 8, wherein: the display panel includes a third electrode group is between the first electrode group and the second electrode group, and the third electrode group includes a fifth anode and a third cathode; and the light-emitting elements further includes a third-color light-emitting element between the first-color light-emitting element and the second-color light-emitting element; and the fifth anode and the third cathode are electrically connected to the third-color light-emitting element.

12. The display apparatus according to claim 4, wherein: binding regions in the display apparatus are arranged along the first direction; and first-color light-emitting elements and second-color light-emitting elements are alternately and repeatedly arranged one after another along the first direction.

13. The display apparatus according to claim 12, wherein: the display panel includes a third electrode group is between the first electrode group and the second electrode group, and the third electrode group includes a fifth anode and a third cathode; and the light-emitting elements further includes a third-color light-emitting element between the first-color light-emitting element and the second-color light-emitting element; and the fifth anode and the third cathode are electrically connected to the third-color light-emitting element.

14. The display apparatus according to claim 11, wherein: a third voltage difference, between the fifth anode and the third cathode, is a drive voltage of the third-color light-emitting element.

15. The display apparatus according to claim 11, wherein: along the second direction, a first distance is between the first cathode and the fifth anode; a second distance is between the first cathode and the third cathode; and the first distance is same as the second distance.

16. A display panel, comprising:
a display region and a binding region, wherein the display region includes a first side and a second side which are opposite to each other; and the binding region is on the first side; and redundant electrodes, wherein a redundant electrode is one of a pair of anodes disposed on two opposite sides of a cathode, and the redundant electrode is not connected to a light-emitting element while the remaining one of the pair of the anodes and the cathode are connected to a light-emitting element.

17. The display panel according to claim 16, further including:

light-emitting elements and a plurality of electrode units which is arranged in an array in the display region, wherein the light-emitting elements include a first-color light-emitting element and a second-color light-emitting element; an electrode unit of the plurality of electrode units includes a first electrode group and a second electrode group; the first electrode group includes a first anode, a first cathode and a second anode; and the second electrode group includes a third anode, a second cathode and a fourth anode; and the first anode and the first cathode are electrically connected to the first-color light-emitting element; and the third anode and the second cathode are electrically connected to the second-color light-emitting element; or the fourth anode and the second cathode are electrically connected to the first-color light-emitting element; and the second anode and the first cathode are electrically connected to the second-color light-emitting element.

18. The display panel according to claim 17, wherein:
a first voltage difference is between the first anode and the first cathode; a second voltage difference is between the second anode and the first cathode; the second voltage difference is between the third anode and the second cathode; and the first voltage difference is between the fourth anode and the second cathode, wherein:
the first voltage difference is a drive voltage of the first-color light-emitting element, and the second voltage difference is a drive voltage of the second-color light-emitting element.

19. The display panel according to claim 17, further including:
a third electrode group between the first electrode group and the second electrode group, wherein:
the third electrode group includes a fifth anode and a third cathode; and
the light-emitting elements further includes a third-color light-emitting element between the first-color light-emitting element and the second-color light-emitting element;
and the fifth anode and the third cathode are electrically connected to the third-color light-emitting element.

20. The display panel according to claim 19, wherein:
a third voltage difference, between the fifth anode and the third cathode, is a drive voltage of the third-color light-emitting element.

* * * * *